United States Patent [19]

Andres et al.

[11] 4,371,125
[45] Feb. 1, 1983

[54] SAFETY BELT SYSTEM

[75] Inventors: Rudolf Andres; Helmut Grantz, both of Sindelfingen, Fed. Rep. of Germany

[73] Assignee: Daimler-Benz A.G., Stuttgart, Fed. Rep. of Germany

[21] Appl. No.: 207,799

[22] Filed: Nov. 17, 1980

[30] Foreign Application Priority Data

Nov. 15, 1979 [DE] Fed. Rep. of Germany ....... 2946130

[51] Int. Cl.³ .................. A62B 35/02; B65H 75/48
[52] U.S. Cl. .......................... 242/107; 242/107.4 R; 280/806
[58] Field of Search .......... 242/107, 107.4 R–107.4 E; 280/806; 297/474–480; 244/122 B

[56] References Cited

U.S. PATENT DOCUMENTS 4,142,692 3/1979 Andres ...................... 242/107.4 R X

FOREIGN PATENT DOCUMENTS 2801320 7/1979 Fed. Rep. of Germany ...... 242/107
2805381 8/1979 Fed. Rep. of Germany.....242/107.4 R
2814550 10/1979 Fed. Rep. of Germany ... 242/107.4 R Primary Examiner—John M. Jillions
Attorney, Agent, or Firm—Paul M. Craig, Jr.

[57] ABSTRACT

A belt strap windup device for eliminating a belt slack of a safety belt system of a motor vehicle upon the motor vehicle exceeding a predetermined vehicle deceleration. The windup device includes a belt roll-up mechanism, a shaft which is constantly acted upon by a retractor, and a windup reel to which the belt is mounted. A pulley is coupled with the shaft at least upon the predetermined deceleration of the vehicle, and an electrically ignitible propellant charge is arranged centrally with respect to the shaft, with the charge being adapted to act upon a driving fluid after an ignition thereof so as to operate the pulley so as to eliminate the slack in the belt. A belt strap mounting recess is provided in an interior of the shaft with a longitudinally aligned belt passage slot and with an insert opening lying at the end face of the shaft. The shaft includes a number of annularly arranged axially aligned ducts filled with the driving fluid, with the ducts terminating at an end face of the shaft. The fluid in the ducts is adapted to be acted upon by the propellant charge after an ignition thereof.

31 Claims, 4 Drawing Figures

SAFETY BELT SYSTEM

The present invention relates to a safety belt system for passenger motor vehicles and, more particularly, to a belt strap windup device for eliminating a belt slack of the safety belt system once a predetermined vehicle deceleration has been exceeded.

In German patent application No. P 26 25 573.2, a safety belt strap windup device of the aforementioned type is proposed wherein a belt roll-up mechanism is provided which is adapted to be automatically blocked in case of danger, for example, a predetermined deceleration of a motor vehicle preceding a collision. The mechanism includes a shaft having a constantly effective retractor and a windup reel to which the belt strap is mounted, a pulley coupled to the shaft, at least in case of danger, and a preferably electrically ignitible propellant charge arranged centrally along the course of the shaft with a driving fluid provided, after ignition of the propellant charge, which operates on the pulley along the lines of eliminating the belt slack.

The aim underlying the present invention essentially resides in providing a safety belt strap windup arrangement of the aforementioned type which, while retaining compact dimensions of the windup device, provides a reliable and absolutely safe belt mounting.

In accordance with advantageous features of the present invention, a belt strap mounting recess is provided in an interior of the shaft, with a longitudinally aligned belt passage slot and, preferably, with an insert opening lying at the end face of the shaft. An interior of the shaft is provided with, preferably, four to five annularly arranged preferably axially aligned ducts filled with the driving fluid. The ducts terminate at an end face of the shaft and, preferably, lie in opposition to the insert opening and are capable of being acted upon, on an orifice or opening side, by the propellant charge.

By virtue of the provision of the belt strap mounting recess in the belt strap windup device in an interior of the shaft according to the present invention, the belt may be securely held in the interior of the shaft and thus may be reliably engaged by the windup reel. The belt passage slot and an insert opening located at an end face of the shaft guarantees a rapid mounting and attachment of the belt end in the mounting recess.

Moreover, with the ducts filled with operating or driving fluid arranged in the interior of the shaft in accordance with the present invention, it is ensured that, without impairing a compactness of the windup device and without enlarging the diameter of the shaft, the shaft has a sufficient material or substance for an adequately rugged mounting recess withstanding even maximum tensile stresses.

Additionally, the belt strap of the windup device of the present invention has the advantage that the shaft of the belt roll-up mechanism may be economically produced from a viewpoint of manufacturing technology in spite of the mounting recess provided in the shaft and in spite of the ducts for the operating fluid. More particularly, the shaft may be made in a single extrusion step while simultaneously molding the operating fluid ducts and the mounting recess.

In order to permit a rapid mounting of the belt strap to the windup reel while reliably securing an end of the belt strap in the interior of the shaft, in accordance with further advantageous features of the present invention, the belt strap mounting recess is provided with a flaring portion which directly adjoins the passage slot and is aligned in parallel thereto, with an end of the belt strap, forming a loop, being held in the flaring portion by means of a mounting pin passed through the loop. Such an arrangement also ensures that the mounting recess has a shape which is advantageous from a manufacturing viewpoint and thus contributes to an inexpensive production of the entire windup device.

In accordance with still further features of the present invention, the flaring portion is fashioned as a blind hole extending in close proximity to a circumference of the shaft and, preferably, the propellant charge is housed or accommodated in a propellant charge chamber formed preferably as a longitudinally extending bore centrally arranged in the shaft and surrounded by the ducts. In addition to providing a mounting recess construction favorable from a manufacturing viewpoint, an additional advantage is attained in that, due to a central arrangement of the propellant chamber in the middle of the operating fluid ducts, the total longitudinal dimensions of the windup device may be kept very small without thereby impairing a functional capacity of the propellant charge system.

Advantageously, for propellant charges in short cartridges having a relatively large diameter, in accordance with additional features of the present invention, the belt strap passage slot penetrates the shaft in a center at right angles and terminates in an outer longitudinal groove forming the flaring portion and, preferably, the propellant charge is housed by a propellant charge chamber arranged coaxially to the shaft on the end face of the shaft exhibiting the duct orifices.

In order to further contribute toward a construction of a windup device which is advantageous from a manufacturing viewpoint, the shaft carries a shaft flange which is preferably integrally formed with the shaft and forms a pulley, with the flange having outwardly oriented outlet ducts each of which is associated with one of the ducts and carries, preferably, formed integrally therewith, a windup flange of the windup reel. Additionally, the shaft flange preferably has a circular or square cross-sectional configuration. By virtue of these features, the shaft, the pulley, and the windup reel may be advantageously produced in a single extrusion step.

In accordance with yet further features of the present invention, a cover is arranged on an end face of the shaft having the duct orifices thereby covering the shaft end face. The cover is provided with connecting chambers between the duct orifices and the propellant charge chamber, with the cover being preferably formed by a cap proper or by a disk held by the cap and containing the connecting chambers in the form of an annular space or recesses and, preferably, the duct orifices are sealed by a piston axially displaceable in the ducts. These features additionally contribute toward a construction of a windup device which is advantageous from a manufacturing viewpoint in that the cap with the annular space may be manufactured in a single process. Moreover, by threading the cap to the shaft it is possible to automatically establish a connection between the operating fluid ducts and the propellant charge chamber. With a propellant charge arranged laterally of the shaft, in accordance with the present invention, the charge may be maintained in a simple manner in a positionally correct association with the operating fluid ducts by a propellant charge chamber integrally formed with the cap. In this connection, the propellant charge chamber may be arranged in the cap having a pot or tank shape and may be in communication with an annular space through radial bores in a bushing held in the cap.

Advantageously, the shaft is rotatably movably accommodated in a housing with the housing being of a tank shape and closed at an end face thereof by a housing cover. Preferably, the belt roll-up mechanism with retractor and pulley is completely enclosed by the housing and the rotational mounting of the shaft is accomplished by means of respective anti-friction bearings such as, for example, ball bearings arranged between the belt roll-up mechanism and the housing bottom or belt roll-up mechanism and the housing cover, respectively. Aside from a further step in a direction toward advantageous construction from a manufacturing viewpoint, a compact windup device is created with the movable parts being entirely integrated into the housing which can be mounted on a motor vehicle in a simple fashion.

Additionally, the belt roll-up mechanism of the present invention operates easily due to the presence of the antifriction bearings thereby substantially reducing the tensile force to be expended by a user of the safety belt system during an extraction of the belt strap. Consequently, the pressure exerted by the belt strap on the body of the user, for example, when bending over in the vehicle seat is no longer felt to be troublesome or unpleasant by the user thereby substantially increasing the user's willingness to deploy the safety belt system.

In order to ensure an especially suitable configuration of the ignition current supply unit and adapting the same to the belt roll-up mechanism, in accordance with further features of the present invention, an ignition current supply means terminates at the propellant charge with the ignition current supply means including a contact surface provided on an outside of the closure members sealing the propellant charge chamber and on an outside of the cap, in each case, coaxially to the shaft, with contact pins resting on each of the contact surfaces and held in a bottom of the housing or cover coaxially to the shaft. Ignition cables terminate in the propellant charge chamber with one cable being extended through a bore in the closure member and joined to one contact surface, with another cable being passed through a further bore in the closure member, through a longitudinal bore in the shaft, and through a bore in alignment therewith provided in the disk, and connected to the other contact surface.

Additionally, it is also possible in accordance with the present invention, with an ignition current supply means terminating at the propellant charge, for the ignition current supply means to include two contact strips arranged axially in series at a mutual spacing at the cap, with a contact pin being mounted directly or indirectly to the housing cover resting on the contact strips, and with the ignition cables terminating in the propellant charge chamber being passed through bores arranged in the cap and connected respectively to one of the contact strips.

Advantageously, in accordance with the present invention, the cap is attached to the shaft preferably by twisting or threading in place and includes an annular flange which forms the other windup flange of the windup reel.

Accordingly, it is an object of the present invention to provide a windup device for a safety belt system for eliminating slack in the safety belt which avoids, by simple means, shortcomings and disadvantages encountered in the prior art.

A further object of the present invention resides in providing a windup device for a strap of a safety belt system which is simple in construction and therefore relatively inexpensive to manufacture.

Yet another object of the present invention resides in providing a windup device for a safety belt system which enables the safety belt system to be made substantially more comfortable for the user thereof.

A further object of the present invention resides in providing a windup device for a strap of a safety belt system which minimizes the pressure exerted by the belt strap on the body of the user.

A still further object of the present invention resides in providing a windup device for a strap of a safety belt system which may be readily mounted in a motor vehicle in an extremely simple manner.

Another object of the present invention resides in providing a windup device for a strap of a safety belt system which functions reliably under all operating conditions.

These and other objects, features, and advantages of the present invention will become more apparent from the following description when taken in connection with the accompanying drawings which show, for the purposes of illustration only, several embodiments in accordance with the present invention, and wherein.

Figure 1:
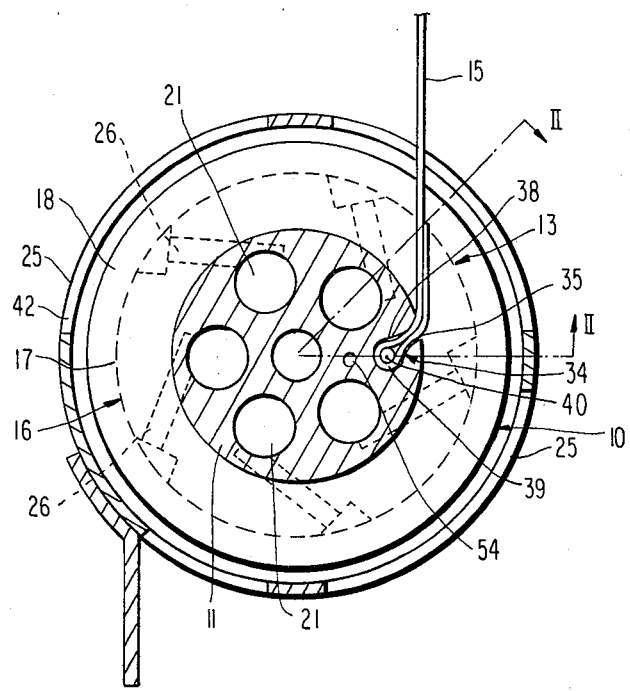
FIG. 1 is a cross-sectional view of a belt strap windup device for a safety belt system in accordance with the present invention.
Figure 2:
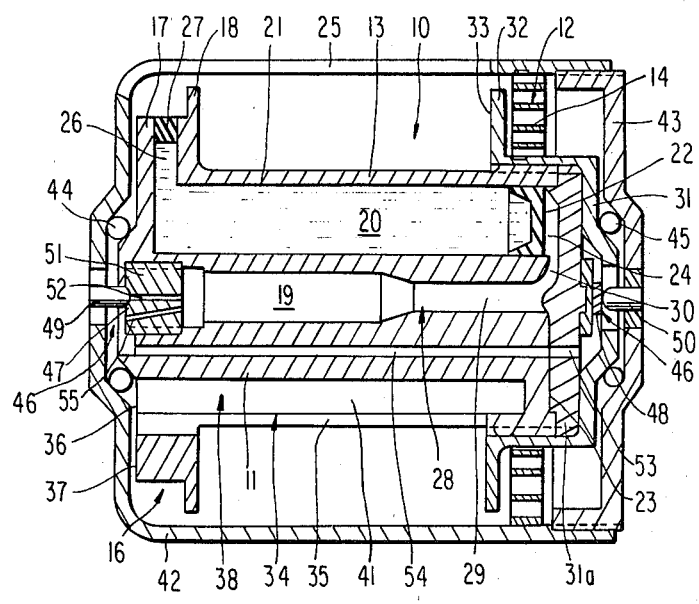
FIG. 2 is a cross-sectional view taken along line II—II in FIG. 1.

Referring now to the drawings wherein like reference numerals are used throughout the various views to designate like parts and, more particularly, to FIGS. 1 and 2, according to these figures, a belt strap windup device for eliminating a slack in a belt of a safety belt system for motor vehicles when a predetermined vehicle deceleration has been exceeded includes a belt roll-up mechanism generally designated by the reference numeral 10 which is adapted to be automatically blocked in case of danger. The roll-up mechanism 10 includes a shaft 11 with a constantly effective retractor generally designated by the reference numeral 12 and a windup reel generally designated by the reference numeral 13.

The retractor 12 is constructed as a flat spring 14 and tends to drive the shaft 11 in a windup direction of a belt strap 15 connected to the windup reel 13. The belt roll-up mechanism 10 also includes a pulley generally designated by the reference numeral 16 coupled with the shaft 11 at least in case of danger, i.e. when the predetermined vehicle deceleration has been exceeded.

In the embodiment of FIGS. 1 and 2, the pulley 16 is fashioned as a shaft flange 17 integrally formed with the shaft 11 and simultaneously constitutes a windup flange 18 of the windup reel 13. As indicated in phantom lines in FIG. 1, the shaft flange 17 has a circular cross-section. An electrically ignitible propellant charge is associated with the belt strap windup device, with the charge, in the form of a cartridge 19, being disposed centrally along a longitudinal axis of the shaft 11. A propellant fluid 20 is arranged downstream of the propellant charge 19, with the propelling or driving fluid being enclosed in the shaft 11 and being adapted to drive the pulley 16 in a direction of eliminating the belt slack upon an ignition of the propellant charge 19. For this purpose, five annularly arranged axially aligned ducts 21 are provided in an interior of the shaft 11, with the ducts 21 being filled with the propelling or driving fluid 20. The ducts 21 terminate at one of the end faces 23 of the shaft 11.

An axially displaceable piston 22 is disposed in each of the ducts 21 for sealing orifices or openings 24 of each of the ducts 21. Each duct 21 is associated with an outlet duct 26 which extends tangentially to the duct 21 and is arranged in the shaft flange 17. Outlet openings of the outlet ducts 26 are sealed by stoppers 27 which, in case of an increased pressure exerted on the propelling fluid 20, may be ejected from the outlet ducts 26.

Upon an ignition of the propellant charge 19, the pistons 22 are acted upon by the propellant charge. For this purpose, the propellant charge, that is, the cartridge 19, is housed in a propellant charge chamber generally designated by the reference numeral 28 which, in the construction of FIGS. 1 and 2, is disposed centrally in the shaft 11 and is surrounded by the ducts 21. In the simplest construction, the propellant charge chamber 28 may be fashioned as a longitudinally continuous bore 29 which may be adapted, for example, as a stepped bore, to the shape of the cartridge 19. Recesses 30 are provided for communicating the propellant charge chamber 28 with the duct openings or orifices 24. The recesses 30 are disposed in a disk 31a placed or mounted onto the end face 23 exhibiting the duct orifices or openings 24. A cap 31 fixes the disk 31a to the shaft 11 by, for example, a threaded connection. The cap 31 includes an annular flange 32 which projects at right angles to the shaft 11, with the annular flange forming the other windup flange 33 of the windup reel 13.

As shown most clearly in FIG. 1, a belt strap mounting recess generally designated by the reference numeral 34 is provided in an interior of the shaft 11. The mounting recess includes a longitudinally directed belt passage slot 35 and an insert opening 36 (FIG. 2) lying at an end face of the shaft 11. A flaring portion 38 immediately adjoins the passage slot 35 and is aligned in parallel thereto. The end of the belt strap 15, formed into a loop 39, is held in the flaring portion 38 by a mounting pin 40 which passes through the loop 39 as shown most clearly in FIG. 1. The flaring portion 38, in the illustrated embodiment, is constructed as a blind bore 41 arranged in close proximity to a circumference of the shaft 11 as shown most clearly in FIG. 2.

The belt roll-up mechanism 10 with the shaft 11, shaft flange 13, and cap 31 threadably secured to the shaft 11 is mounted so as to be rotationally movable in a housing 42 in such a manner that the belt roll-up mechanism may rotate about the longitudinal axis of the shaft 11. The housing 42, provided with longitudinally extending slots 25, is of a tank-shaped configuration and is sealed at an end face by means of a housing cover 43 connected to the housing 42 by suitable connecting means such as, for example, a threaded connection.

Two ball bearing arrangements 44, 45 are provided for rotatably mounting the belt roll-up mechanism 10 in the housing 42. The shaft flange 17 is supported through one ball bearing arrangement 44 on a bottom of the tank-shaped housing 42 and the cap 31 is supported through the ball bearing arrangement 45 on the housing cover 43.

To ignite the propellant charge 19, an ignition current supply means generally designated by the reference numeral 46 is provided. The current supply means 46 terminates in the propellent charge chamber 28 and generates an electrical spark igniting the propellant charge 19. The ignition current supply means 46 may include two mutually insulated contact surfaces 47, 48 coaxially arranged with respect to the shaft 11. Contact pins 49, 50 mounted in the housing 42 coaxial with respect to the shaft 11 respectively rest on the contact surfaces 47, 48. The contact pin 49 is arranged in a bottom of the housing 42 and the contact pin 50 is mounted in the housing cover 43. The contact surface 47 is disposed on a closure member 51 sealing the propellant charge chamber 28 at the end face of the shaft 11. The closure member 51 is threaded into the propellant charge chamber which, as noted above, is fashioned as a bore 29. In contradistinction thereto, the other contact surface 48 is directly provided on the disk 31a. The contact surfaces 47, 48 are connected, in a conventional manner, to ignition cables (not shown) which terminate in the propellant charge chamber 28.

In the above-described ignition arrangement, the ignition cable connected to the contact surface 47 is extended through a bore 52 provided in the closure member 51. The ignition cable connected to the contact surface 48 is extended from the contact surface 48 through a bore 53 in the disk 31a, a bore 54 in alignment with the bore 53 in the shaft 11, and a bore 55 provided in the closure member 51.

If a sensor means, for example a collision sensor, senses a vehicle deceleration which exceeds a predetermined value, the sensor (not shown) provides an output signal so that an ignition current is supplied, in a conventional manner, through the contact pins 49, 50, to the ignition current supply means 46 of the propellant charge 19, with the propellant charge 19 then being combusted and generating a gas which passes through the bore 29 and recesses 30 and subsequently acts on the pistons 22 in the ducts 21. Once the gas pressure has reached a predetermined magnitude, the pistons 22 are displaced and simultaneously the stoppers 27 are rejected out of the outlet ducts 26. The driving fluid 20 thereby exits through the outlet ducts 26 at a high speed and imparts an annular momentum or spin to the shaft flange 17 forming the pulley 16. This momentum quickly winds up the belt strap in a tightening or shortening direction thereby eliminating any present belt slack. After this procedure, a blocking mechanism (not shown) of a conventional construction, may be triggered by, for example, a pendulum, with the blocking mechanism acting on the belt roll-up mechanism 10 to block the same against rotation against a belt windup direction.

Figure 3:
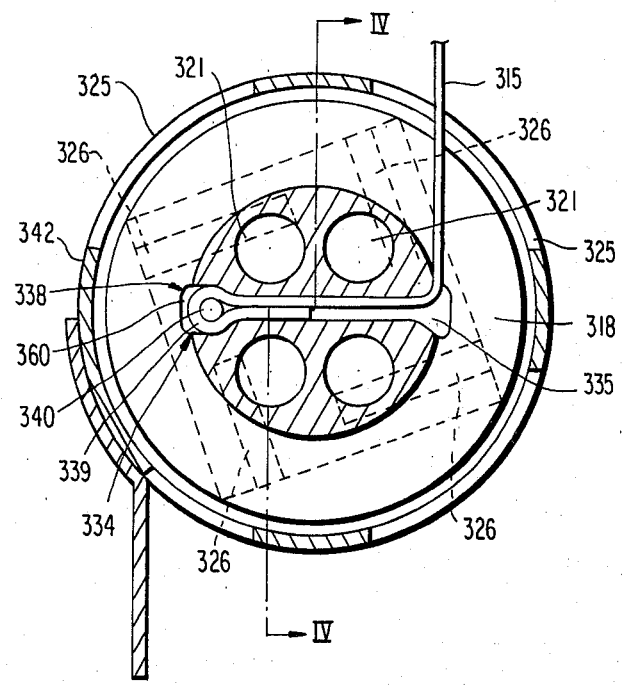
FIG. 3 is a cross-sectional view of a belt strap windup device for a safety belt system in accordance with a further embodiment of the present invention.
Figure 4:
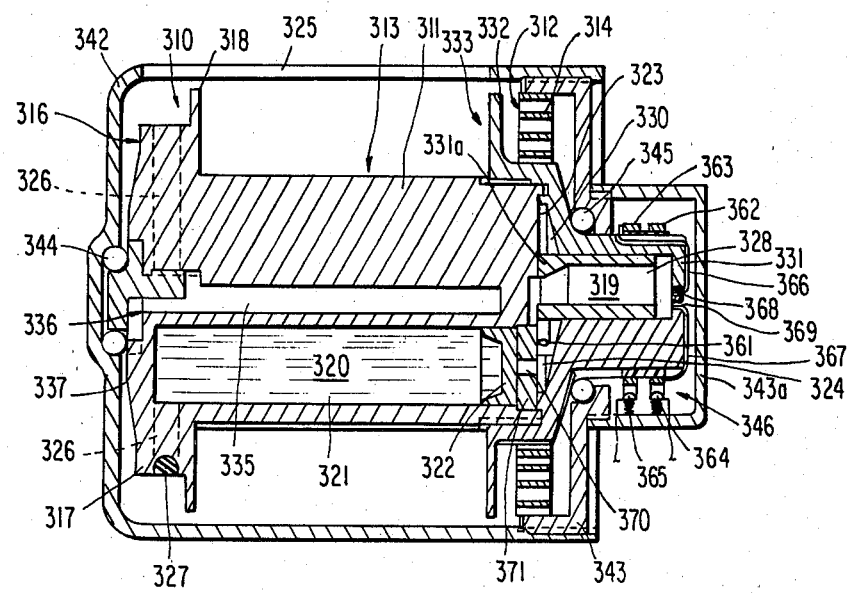
FIG. 4 is a cross-sectional view taken along line IV—IV in FIG. 3.

The belt strap windup device of FIGS. 3 and 4 conforms in principle to the windup device of FIGS. 1 and 2 and, in FIGS. 3 and 4, identical components bear the same reference numerals increased by a figure 300. More particularly, according to FIGS. 3 and 4, a belt roll-up mechanism generally designated by the reference numeral 310 is rotatably mounted in a tank-shaped housing 342 by means of ball bearing arrangements 344, 345. The belt roll-up mechanism 310 includes a shaft 311 having a constantly effective retractor generally designated by the reference numeral 312 formed as a flat spring 314 and a windup reel generally designated by the reference numeral 313. A belt strap 315 is fixed in a belt strap mounting recess generally designated by the reference numeral 334 provided in an interior of the shaft 311 with the belt strap 315 extending through a belt passage slot 335.

In contradistinction to the belt windup mechanism 10 of FIGS. 1 and 2, the passage slot 335 penetrates the shaft 311 over an entire diameter thereof and terminates in an external longitudinal groove 360 forming a flaring portion generally designated by the reference numeral 338. An end of the belt strap 315, formed as a loop 339, is held in the external longitudinal groove 360 by means of a mounting pin 340 extending through the loop 339. The belt strap 315 passes through the entire passage slot 335 and exits from the slot 335 on a side of the shaft 311 diametrically opposite to the outer longitudinal groove 360. The belt strap mounting recess 334 has an insert opening generally designated by the reference numeral 336 lying on an end face 337 of the shaft 311, from which opening 336 the belt strap 315 with belt loop 339 and mounting pin 340 may be inserted in the mounting recess 334.

In the embodiment of FIGS. 3 and 4, an interior shaft 311 is only provided with four ducts 321 arranged annularly and symmetrically, with each of the four ducts 321 including a duct orifice 324 sealed by a piston 322 and an outlet duct 326. A shaft flange 317 forming a pulley generally designated by the reference numeral 316 has a square cross-sectional configuration and likewise carries a windup flange 318 of the windup reel 313, with the flange 318 being integrally formed with the shaft flange 317.

In the windup mechanism of FIGS. 3 and 4, a propellant charge 319, also in the form of a cartridge, is housed in a propellant charge chamber 328. In contradistinction to the charge chamber 28 in the windup mechanism of FIGS. 1 and 2, in the mechanism of FIGS. 3 and 4, the charge chamber 328 is not arranged in the interior of the shaft 311 but rather at an end face 323 thereof.

Advantageously, the propellant charge chamber 328 may be provided with a cap 331 attached to the end face 323. The cap 331 may, in turn, carry an annular flange 332 forming the other windup flange 333 of the windup reel 313. For this purpose, the cap 331 has a pot or tank-shaped configuration and the propellant charge chamber 328 is arranged centrally in the cap 331 and in a bushing 331a held therein. Advantageously, the cap 331 is secured to the shaft 311 by a threaded connection. The cap 331 includes an annular chamber 330 which is in communication, through radial bores 361 in the bushing 331a, with the propellant charge chamber 328. The annular chamber or space 330 extends, as in the previously described windup mechanism, beyond the duct orifices 324 which are additionally respectively sealed by a cover plate 371, each containing a bore 370.

An ignition current supply means 346 terminates in the propellant charge chamber 328 and, in the windup mechanism of FIGS. 3 and 4, includes annular contact strips 362, 363 arranged in series at a mutual axial spacing at the cap 331. Contact pins 364, 365, respectively rest on the contact strips 362, 363 and are held on a pot-shaped cover cap 343a of the housing cover 343. The contact strips 362, 363 are connected to ignition cables 366 and 367 passed through bores 368, 369 in the cap 331 and terminate in the propellant charge chamber 328.

As with the windup mechanism of FIGS. 1 and 2, when a collision sensor (not shown) senses a predetermined vehicle deceleration, the ignition current is supplied to the contact pins 364 and 365. In all other respects the mode of operation of the belt strap windup device of FIGS. 3 and 4 is the same as described hereinabove in connection with the windup device of FIGS. 1 and 2.

While we have shown and described only two embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A windup means for a belt of a safety belt system for passenger motor vehicles for eliminating a slack in the belt upon a vehicle exceeding a predetermined deceleration, the windup means includes a belt roll-up mechanism comprising a shaft means, a retractor means constantly effectively acting upon the shaft means, a windup reel means connected to said shaft means, a pulley means adapted to be coupled with the shaft means at least upon a predetermined vehicle deceleration so as to eliminate the slack in the belt, and an ignitible propellant charge means for propelling a driving fluid so as to enable the windup means to eliminate the slack in the belt, characterized in that recess means are provided in an interior of the shaft means for mounting the belt to the shaft means, the recess means include a longitudinally extending belt passage slot provided in the interior of the shaft means, a plurality of duct means filled with the driving fluid are arranged in the interior of the shaft means, the duct means terminate in openings at an end face of the shaft means, means are provided for communicating the duct means with the propellant charge means so as to enable the propellant charge means to act upon the driving fluid after an ignition of the propellant charge means, and in that means are provided for communicating the duct means with the pulley means whereby the driving fluid operates the pulley means to eliminate the slack in the belt upon ignition of the propellant charge means.

2. A windup means according to claim 1, characterized in that the plurality of duct means are annularly disposed about the shaft means and axially aligned, and in that an insert opening is provided in an end face of the shaft means for enabling an insertion of the belt into the recess means.

3. A windup means according to claim 2, characterized in that the means for communicating the duct means with the propellant holding means is disposed at an end face of the shaft means opposite the end face with the insert opening.

4. A windup means according to claim 3, characterized in that the ignitible propellant charge means is arranged centrally of the shaft means.

5. A windup means according to one of claims 1, 2, 3, or 4, characterized in that the recess means further includes a flaring portion directly adjoining the belt passage slot, the flaring portion is disposed in parallel to the belt passage slot, and in that holding means are provided for holding the belt in the flaring portion.

6. A windup means according to claim 4, characterized in that an end of the belt is formed as a loop, and in that the holding means includes a mounting pin means extending through the loop and being accommodated in the recess means.

7. A windup means according to claim 6, characterized in that the flaring portion is formed as a blind hole extending in close proximity to an outer circumference of the shaft means, and in that a propellant charge chamber means is provided for accommodating the propellant charge means.

8. A windup means according to claim 7, characterized in that the propellant charge chamber means includes a longitudinally extending bore arranged centrally in an interior of the shaft means, and in that said duct means surrounds the bore.

9. A windup means according to one of claims 1 or 2, characterized in that the belt passage slot extends through a center of the shaft means and terminates in an outer longitudinal groove forming a flaring portion, and in that means are arranged coaxially with the shaft means at an end face of the shaft means for accommodating the propellant charge means.

10. A windup means according to claim 9, characterized in that the propellant charge means accommodating means is a propellant charge chamber arranged at the end face of the shaft means in which the duct means terminate, and in that the belt passage slot extends through the center of the shaft means at a right angle to a longitudinal center axis of the shaft means.

11. A windup means according to one of claims 1 or 2, characterized in that the shaft means includes a shaft flange means for forming the pulley means, the means for communicating the duct means with the pulley means includes a plurality of outwardly directed ducts arranged in the shaft flange means, each of the outwardly directed ducts are respectively associated with one of the duct means arranged in the shaft means, and in that a windup flange of the windup reel means is carried by the shaft means.

12. A windup means according to claim 11, characterized in that the shaft flange means and windup flange means is integrally formed with the shaft means.

13. A windup means according to claim 12, characterized in that the shaft flange means has a circular cross-sectional configuration.

14. A windup means according to claim 12, characterized in that the shaft flange means has a square cross-sectional configuration.

15. A windup means according to claim 12, characterized in that a first cover means is provided for covering the end face of the shaft means in which the duct means terminate, the means for communicating the duct means with the propellant charge means includes at least one connecting chamber arranged between the propellant charge means and openings of the respective duct means, and in that axially displaceable means are disposed in each of the duct means for sealing the duct means with respect to the at least one connecting chamber.

16. A windup means according to claim 15, characterized in that the sealing means are formed as pistons displaceably mounted in the respective duct means.

17. A windup means according to claim 16, characterized in that the first cover means is a cap, and in that the at least one connecting chamber is formed between the cap and an end face of the shaft means.

18. A windup means according to claim 17, characterized in that the at least one connecting chamber is formed by an annular space.

19. A windup means according to claim 17, characterized in that the first cover means is formed as a disk, and in that a cap means is provided for holding the disk at the end face of the shaft means.

20. A windup means according to claim 17, characterized in that means are provided for rotatably mounting the shaft means in a housing having a closed bottom end and an open end, a housing cover means is provided for covering the open end of the housing, and in that the means for rotatably mounting the shaft means are disposed between the belt roll-up mechanism, the bottom end of the housing, and the housing cover means, respectively.

21. A windup means according to claim 20, characterized in that the housing is of a tank-shape and completely encloses the belt roll-up mechanism, and in that the mounting means includes ball bearing means.

22. A windup means according to claim 21, characterized in that one of the ball bearing means rests on the shaft flange means and the other ball bearing means rests on the cap.

23. A windup means according to claim 22, characterized in that a propellant charge chamber means is provided for accommodating the propellant charge means, closure means are provided for sealing the propellant charge chamber means, an ignition current supply means terminates at the propellant charge means, the current supply means includes contact surface means mounted in the housing so as to be coaxial with respect to the shaft means, contact pin means respectively mounted in the bottom end of the housing and the housing cover means and adapted to rest on the contact strip means, and ignition cables terminating in the propellant charge chamber means.

24. A windup means according to claim 23, characterized in that a first bore means is provided in the closure for enabling an ignition cable to extend therethrough into the propellant charge chamber means to be connected to one of the contact surface means, a disk member is interposed between the cap and an end face of the shaft means, a bore means is provided in the disk member for enabling a further ignition cable to extend therethrough, a longitudinally extending bore means is provided in the shaft means in axial alignment with the bore means in the disk member for accommodating the further ignition cable, and in that a further bore means is provided in the closure means for enabling the further ignition cable to extend into the propellant charge chamber means.

25. A windup means according to claim 22, characterized in that an ignition current supply means is provided, the ignition current supply means includes at least two contact strip means arranged on the cap at an axial spacing, a contact pin means mounted on the housing cover means and resting on the contact strip means, and ignition cables extending from the respective contact strip means to the propellant charge means.

26. A windup means according to claim 25, characterized in that bore means are arranged in the cap for accommodating the ignition cables.

27. A windup means according to claim 26, characterized in that the cap is threadably attached to the shaft means and includes an annular flange forming a second windup flange means of the windup reel means.

28. A windup means according to claim 27, characterized in that the belt passage slot extends through a center of the shaft means and terminates in an outer longitudinal groove forming a flaring portion, and in that means are arranged coaxially with the shaft means at an end face of the shaft means for accommodating the propellant charge means.

29. A windup means according to claim 28, characterized in that the propellant charge means accommodating means is a propellant charge chamber arranged at the end face of the shaft means in which the duct means terminate, and in that the belt passage slot extends through the center of the shaft means at a right angle to a longitudinal center axis of the shaft means.

30. A windup means according to claim 17, characterized in that a propellant charge chamber means is arranged in the cap for accommodating the propellant charge means, a bushing means is provided for mounting the propellant charge means in the cap, and in that radially extending bore means are provided in the bushing means for communicating the propellant charge chamber means with the at least one connecting chamber.

31. A windup means according to claim 17, characterized in that the at least one connecting chamber is formed by recesses.

* * * * *